PULSE DECODING SYSTEM HAVING TAPPED DELAY LINE

Filed June 7, 1967

2 Sheets-Sheet 1

INVENTOR.
AGUSTIN VILLAFANA
BY Fraser and Bogucki
ATTORNEYS

INVENTOR.
AGUSTIN VILLAFANA
BY Fraser and Bogucki
ATTORNEYS

United States Patent Office 3,496,546

Patented Feb. 17, 1970

3,496,546

PULSE DECODING SYSTEM HAVING TAPPED DELAY LINE

Agustin Villafana, Sylmar, Calif., assignor to Whittaker Corporation, Los Angeles, Calif., a corporation of California Filed June 7, 1967, Ser. No. 644,134
Int. Cl. H04q *1/32*
U.S. Cl. 340—167 12 Claims

ABSTRACT OF THE DISCLOSURE

A decoding system in which taps located along a delay line monitor the leading and trailing edges of the pulse and no-pulse intervals of a coded signal with infinite resolution. With the taps located in accordance with the smallest pulse or no-pulse interval in the coded signal, an output signal is provided by the system if predetermined signal conditions simultaneously exist at all of the taps during a period of time corresponding to the smallest interval.

BACKGROUND OF THE INVENTION

Field of the invention

The present invention relates to pulse decoding systems, and more particularly to decoding systems which monitor the conditions along a pulse receiving delay line.

Description of the prior art

Pulse decoding systems may involve a variety of different arrangements for monitoring incoming signals to provide an output indication when a signal is received which satisfies a predetermined code. Those systems which are designed to decode sginals comprising a succession of pulse and no-pulse intervals often employ a delay line which is coupled to receive the incoming signals. The signal conditions along the delay line are monitored such as by locating a plurality of taps along the line and anding and inverting the signals appearing at such taps as necessary to provide an indication when a received signal satisfies the code. The signals to be decoded may comprise a considerable number of pulse and no-pulse intervals of varying shapes and sizes, and if such is the case, a relatively large number of taps must be located along the delay line to provide a reasonable degree of resolution. However, even an unrealistically large number of taps may not provide the desired degree of resolution, since a received signal varying only slightly from the code may provide a false solution.

SUMMARY OF THE INVENTION

In brief, the present invention provides infinite or near infinite resolution of signals received by a delay line by locating a plurality of taps along the delay line in a particular manner and monitoring the signals conditions at the various taps in accordance with a characteristic of the coded signal itself. A tap is located at the position that the leading edge of each pulse and no-pulse interval will assume along the delay line at a given instant in time. Additional taps are located from the trailing edges of the pulse and no-pulse intervals by a distance equal to the smallest pulse or no-pulse interval in the coded group. Additional taps are located along the delay line as necessary so that the distance between adjacent taps within each interval does not exceed the length of the smallest pulse or no-pulse interval. In cases where the leading and trailing edges of the pulse and no-pulse intervals are variable within defined limits, the location of the leading and trailing edge taps is determined in accordance with the point of minimum extension of such variable leading and trailing edges.

All of the taps are coupled to appropriate logic circuitry to provide a given signal condition when predetermined conditions at all of the taps simultaneously exist. If the given signal condition is provided by the logic circuitry for a period of time corresponding to the smallest pulse or no-pulse interval, the code is satisfied and an output indication to this effect is provided.

In accordance with one preferred arrangement of output circuitry, the appearance of the given signal condition at the output of the logic circuitry results in a signal being applied to the input end of a delay line having a length corresponding to the smallest pulse or no-pulse interval of the coded signal. The signal propagates along the delay line to the output where it activates a gate circuit to provide an indication that the code is satisfied. If at any time during the propagation the signal condition at the output of the logic circuitry changes from the given condition, then the output gate is inhibited and the indication that the code is satisfied is accordingly not provided.

In acordance with an alternative output arrangement, the given signal indication itself is inverted and applied to the input end of a delay line having a length corresponding to the smallest pulse or no-pulse interval of the coded signal. The opposite ends of the delay line and a plurality of taps located along the length thereof are individually coupled to separate inputs of a circuit which provides an output indication only when all inputs are satisfied. When the signal has propagated to the end of the delay line, the presence of a signal at all of the taps plus the input and output ends of the delay line results in an indication that the code is satisfied.

BRIEF DESCRIPTION OF THE DRAWING

The novel features of this invention, as well as the invention itself, both as to its organization and method of operation, may best be understood when considered in the light of the following description, when taken in connection with the accompanying drawing, in which.

DESCRIPTION OF THE PREFERRED EMBODIMENTS

Figures 1A, 1B, 1C:
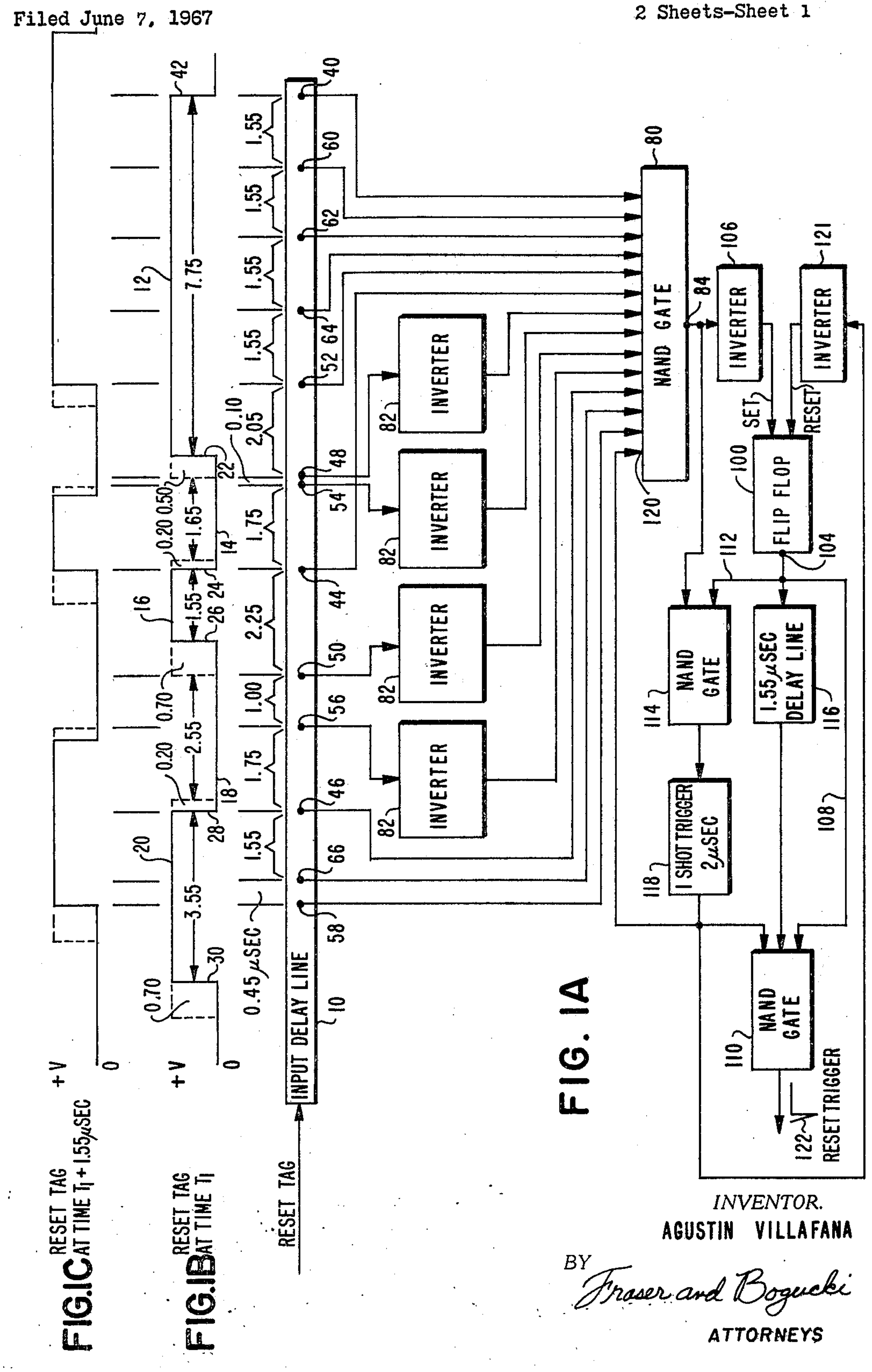
FIG. 1A is a block diagram of a preferred arrangement of pulse decoding system in accordance with the invention.
FIGS. 1B and 1C are diagrammatic illustrations of the position of a coded signal relative to the input delay line of the FIG. 1A arrangement at the beginning and end of a signal monitoring interval respectively.

Pulse decoding systems have a wide variety of applications such as in communication systems yhere it may be necessary to identify and separate one particular signal from a plurality of similar yet different signals. In a preferred embodiment of the present invention as illustrated in FIG. 1A, a plurality of signals to be decoded are successively applied to the input end of an input delay line 10. The particular signal which will satisfy the predetermined code of the system is in this instance referred to as a reset tag and is illustrated diagrammatically in FIGS. 1B and 1C. The reset tag may comprise a succession of pulse and no-pulse intervals, the individual lengths of which can be designated in terms of the time required for a signal to propagate between given points on the delay line having known characteristics. The reset tag comprises a first pulse interval 12 having a length of 7.75 microseconds, a first no-pulse interval 14 having a length of 1.65 microseconds, a second pulse interval 16 having a length of 1.55 microseconds, a second no-pulse interval 18 having a length of 2.55 microseconds, and a third pulse interval 20 having a length of 3.55 microseconds. The trailing edge 22 of the first pulse interval 12 is variable within defined limits of 0.50 microsecond. The leading and trailing edges 24 and 26 of the second pulse interval 16 are variable within defined limits of 0.20 microsecond and 0.07 microsecond respectively. The leading and trailing edges 28 and 30 of the third pulse interval 20 are variable within defined limits of 0.20 microsecond and 0.70 microsecond respectively. Since in this particular instance some of the leading and trailing edges of the pulse intervals are variable, it is necessary that the decoding system be able to indicate that a signal within the variations illustrated satisfies the code, and at the same time exclude all other signals.

In many types of prior art systems, it is necessary to locate a large number of taps along the input delay line 10 and monitor the signal conditions at all of the taps at a given instant in time. If the desired signal conditions exist simultaneously at all of such taps, then the code is satisfied. Greater resolution is typically realized by locating the taps relatively close together so that a signal which is similar to but not within the limits of the code will not be accepted as satisfying the code. However, as previously pointed out the close spacing of the taps may require an impractically large number of associated logic components, yet such a system may still not provide the degree of resolution required in very high accuracy systems.

In accordance with the present invention, a plurality of taps are located along the input delay line 10 in accordance with the smallest pulse or no pulse interval and are continuously monitored for a period of time corresponding to such smallest interval. The reset tag received at the input end of the delay line 10 is propagated along the delay line at a speed determined by the electrical properties of the delay line. An initial tap 40 located close to the output end of the delay line 10 detects the leading edge 42 of the reset tag at given instant in time $T_1$ as the reset tag is propagating along the delay line. At the instant in time $T_1$ the location of the reset tag along the length of the delay line 10 is as shown in FIG. 1B. Taps 44 and 46 are located at the leading edges 24 and 28 of the pulse intervals 16 and 20. Since both of the leading edges 24 and 28 are variable within defined limits, the taps 44 and 46 are located at points corresponding to the minimum possible position of such leading edges. Taps 48 and 50 are located at the leading edges of the no-pulse intervals 14 and 18 respectively. Since the leading edges of the no-pulse intervals 14 and 18, which leading edges coincide with the trailing edges 22 and 26 of the preceding pulse intervals, are variable within defined limits, the taps 48 and 50 are located at the minimum possible positon of the no-pulse leading edges.

The smallest pulse or no-pulse interval of the reset tag is the pulse interval 16 which has a length of 1.55 microseconds. Accordingly, taps are located downstream or in the direction of wave propagation from the trailing edges of the pulse and no-pulse intervals by a distance equal to the smallest pulse or no-pulse interval, in this instance 1.55 microseconds. A tap 52 is located 1.55 microseconds downstream from the minimum defined limit of the trailing edge 22 of the first pulse interval 12. Since the trailing edge 22 is variable within a range of 0.50 microsecond, the tap 52 is spaced 2.05 microseconds downstream from the position of maximum extension of the trailing edge 22. Following the same procedure taps 54, 56 and 58 are located relative to the trailing edges of the no-pulse intervals 14 and 18 and the pulse interval 20 respectively. Since the pulse interval 16 is 1.55 microseconds in length, the tap 44 suffices as both the leading edge tap and the trailing edge tap of that interval.

It is possible that an input signal to the delay line 10 could satisfy all of the leading and trailing edge requirements as shown in FIG. 1B, yet have additional pulse or no-pulse intervals. For example, the first pulse interval 12 might have one or more short no-pulse intervals spaced along the length thereof which would go undetected by the taps 40 and 52. Since in accordance with the present invention the delay line taps are monitored for a period of time equal to the smallest pulse or no-pulse interval, no portion of the delay line length equal to or greater than such interval should go unmonitored. This is done by locating additional taps along the delay line so that the maximum distance between any two adjacent taps within any pulse or no-pulse interval is 1.55 microseconds. Since the distance between the taps 40 and 52 is greater than 1.55 microseconds, taps 60, 62 and 64 are located therebetween. Again, since the distance between the taps 46 and 58 is greater than 1.55 microseconds, a tap 66 is located therebetween.

It will therefore be appreciated that during the interval between the instant in time $T_1$ and an instant 1.55 microseconds later, the same signal conditions will exist at all of the various taps along the delay line 10. A positive signal will appear at each of the taps 40, 60, 62, 64, 52, 44, 46, 66 and 58 during this monitoring interval, and no signal will exist at the taps 48, 54, 50 and 56. This property of the delay line and its associated taps is utilized in accordance with the invention to distinguished between proper and false reset tags.

Each of the taps sensing a positive signal during the monitoring period are individually coupled to separate inputs of a NAND gate 80. The taps which have no signal present during the monitoring interval are individually coupled to separate inputs of the NAND gate 80 through inverter circuits 82. The NAND gate 80 provides a signal at its output terminal 84 unless signals are present at all of the inputs. The inverter circuits 82 provide signals to the associated inputs of the NAND gate 80 so long as the inverter inputs are at a zero or substantially zero level. Therefore, if all of the various predetermined signal conditions exist at the taps throughout the monitoring period, a given output condition at the terminal 84 remains during this period and the code is satisfied. On the other hand, if one or more of the signals at the taps 40, 60, 62, 64, 52, 44, 46, 66 and 58 should drop to zero during the monitoring interval, or if the signal conditions at one or more of the taps 48, 54, 50 and 56 should rise from zero to a positive level during the interval, then the given signal condition at the output terminal 84 of the NAND gate 80 changes indicating that a false reset tag is present. In actual practice the number of delay line taps may exceed the number of input terminals available in a single logic device such as the NAND gate 80. If such is the case then some of the taps may be coupled to the inputs of one or more AND circuits, the outputs of which may themselves be coupled to inputs of the NAND gate 80.

FIG. 1A illustrates one preferred form of output circuit arrangement. Prior to the receipt of the reset tag by the delay line 10, a flip-flop 100 is in its reset state and no output signal appears at the output terminal 104 of the flip-flop. If the subsequently received reset tag satisfies all of the inputs of the NAND gate 80, the zero signal level at the output terminal 84 is inverted by an inverter 106 to switch the flip-flop 100 into its set state. The resulting signal which appears at the flip-flop output terminal 104 is applied via a lead 108 to an input of a NAND gate 110 and via a lead 112 to an input of a NAND gate 114. The flip-flop output signal is also applied to the input of a delay line 116 having a length equal to the monitoring interval of 1.55 microseconds, the smallest pulse or no-pulse interval in the reset tag, The signal provided at the output of the NAND gate 80 is also coupled as a second input of the NAND gate 114. So long as the given signal condition of zero or substantially zero voltage exists at the output terminal 84, only one input of the NAND gate 114 is energized and the resulting NAND gate output does not initiate a 2 microsecond one shot trigger 118. The output of the one shot trigger 118, which is normally at a high signal level, is coupled as a third input to the NAND gate 110, as an inhibit input 120 to the NAND gate 80, and through an inverter 121 to the reset input of the flip-flop 100.

Prior to the time when the signal propagating along the delay line 116 reaches the input of the NAND gate 110, two of the three NAND gate 110 inputs are energized (or satisfied) by the signals at the outputs of the trigger 118 and the flip-flop 100 and a high signal level is provided at the output of the NAND gate 110. The high signal level at the output of the trigger 118 also satisfies the input 120 of the NAND gate 80 enabling the given signal condition to exist at the output terminal 84 so long as all other NAND gate 80 inputs are satisfied. The high signal level at the trigger 118 output is inverted by the inverter 121 to a zero or substantially zero level so as not to reset the flip-flop 100. If the given signal condition exists at the output terminal 84 of the NAND gate 80 for the entire monitoring interval, the signal which has been propagating along the delay line 116 satisfies the third input of the NAND gate 110 and the output of the NAND gate 110 drops to zero generating a reset trigger pulse 122 to indicate that the code is satisfied. Immediately thereafter the continued propagation of the reset tag along the input delay line 10 results in one or more of the NAND gate 80 inputs becoming unsatified. The resulting rise in signal level at the output terminal 84 is applied to the NAND gate 114 to drop the gate 114 output to zero. When this happens the trigger 118 is initiated and its output signal level falls to zero for a period of two microseconds eliminating one of the three necessary high signal level inputs to the NAND gate 110. The output of the NAND gate 110 accordingly again rises so that the reset trigger 122 appears as a short pulse as illustrated in FIG. 1A.

In actual practice the length of the delay line 116 must be made very slightly less than the length of the smallest pulse or no-pulse interval to allow the reset trigger 122 to be generated before the NAND gate 110 senses the drop of the trigger 118 output. The amount by which the length of the delay line 116 is made shorter than the smallest pulse or no-pulse interval depends on the response times of the various circuit components, a delay line 116 having a length of 1.50 microseconds or 1.52 microseconds being satisfactory in the present example.

Upon termination of the monitoring interval with its resultant initiation of the trigger 118, the zero or substantially zero signal level at the trigger 118 output inhibits the NAND gate 80 from providing the given signal condition at the output terminal 84 for a period of 2 microseconds by rendering the input terminal 120 unsatisfied. This allows the system to prepare for the subsequent decoding of a new reset tag on the input delay line 10. The zero signal level at the trigger 118 output is also inverted by the inverter 121 to reset the flip-flop 100 in preparation for the next input signal.

As previously mentioned the monitoring interval of 1.55 microseconds is begun when a received signal on the input delay line 10 results in all of the NAND gate 80 inputs being satisfied. The flip-flop 100 is switched into its set state and the monitoring begins. If at any time during the monitoring interval one or more of the NAND gate 80 inputs become unsatisfied indicating that a false reset tag is present, the resultant initiation of the trigger 118 renders the associated NAND gate 110 input ineffective. The flip-flop 100 is also reset rendering the NAND gate 110 input from the lead 108 ineffective. Thus when the signal propagating along the delay line 116 reaches the associated NAND gate 110 input, only one of the three inputs is satisfied and an indication that the code has not been satisfied is provided by the absence of a reset trigger 122 at the NAND gate 110 output. Upon termination of the 2 microsecond trigger, the system is prepared to monitor the next received signal.

It will be appreciated by those skilled in the art that the output arrangement illustrated in FIG. 1A is continuously responsive to the NAND gate 80 during the entire monitoring interval and prevents subsequent generation of a reset trigger pulse 122 the first time one of the NAND gate 80 inputs becomes unsatisfied during the monitoring interval. The advantageous operation of the output arrangement in combination with the particular location of the taps along the delay line 10 provides for substantially infinite resolution.

Figure 2:
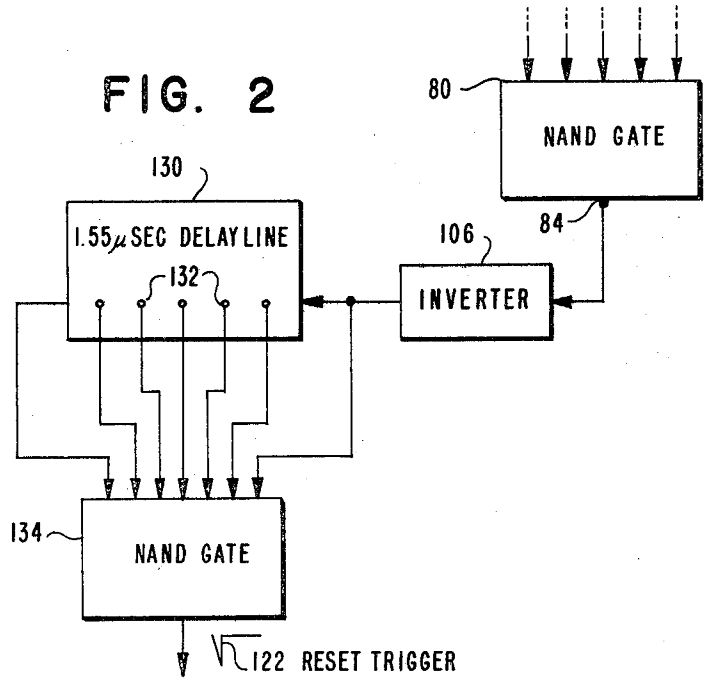
FIG. 2 is a block diagram of an alternative arrangement of output circuitry which may be used in the arrangement of FIG. 1A.

An alternative output arrangement which reduces and simplifies the circuit components required at the expense of some quality in the resolution is illustrated in FIG. 2. The given signal condition at the output terminal 84 of the NAND gate 80 when all inputs are satisfied is inverted by the inverter 106 and applied to the input end at a 1.55 microsecond delay line 130. The input and output ends of the delay line 130 as well as a plurality of taps 132 spaced along the length of the delay line are coupled to individual inputs of a NAND gate 134. If the given signal condition at the output terminal 84 exists during the entire monitoring interval, all of the inputs of the NAND gate 134 will be satisfied and the reset trigger pulse 122 is generated. If, however, the given signal condition disappears at any time during the monitoring interval, one or more breaks occur in the signal propagating along the delay line 130 and one or more of the NAND gate 134 inputs are not satisfied at the end of the monitoring interval. As in the case of the delay line 116 in the arrangement of FIG. 1A, the delay line 130 in actual practice should have a length slightly less than the smallest pulse or no-pulse interval to allow for component response time in the generation of a reset trigger pulse 122. The accuracy of the output arrangement illustrated in FIG. 2 depends in part on the number of taps 132 located along the delay line 130. If the given signal condition at the output terminal 84 of the NAND gate 80 momentarily disappears during the monitoring interval, the resulting break in the inverted signal may be located between two of the taps 132 at the end of the interval thereby going undetected. Although such a possibility is unlikely if a substantial number of taps 132 are used, the output arrangement illustrated in FIG. 1A avoids any such possibility altogether by continuously responding to the given signal condition at the output terminal 84 during the entire monitoring interval.

In actual practice it has been found desirable in some instances to couple the various taps on the input delay line 10 through an interface card to the respective inverter and NAND gate inputs so that the inverters 82 and the gate 80 will not unnecessarily load the delay line 10. Since in actual practice some reset tags have edges which are not perfectly vertical, the interface card can be used to adjust the position of the taps and thereby the point along the associated edge at which the desired tap signal condition will be provided.

The delay lines 10 and 116 in the arrangement of FIG. 1A and the delay line 130 in the arrangement of FIG. 2 may assume any appropriate form. In one decoding system constructed, tested and operated in accordance with the invention, conventional lumped-constant inductance-capacitance delay lines have proven to be satisfactory.

Figure 3:
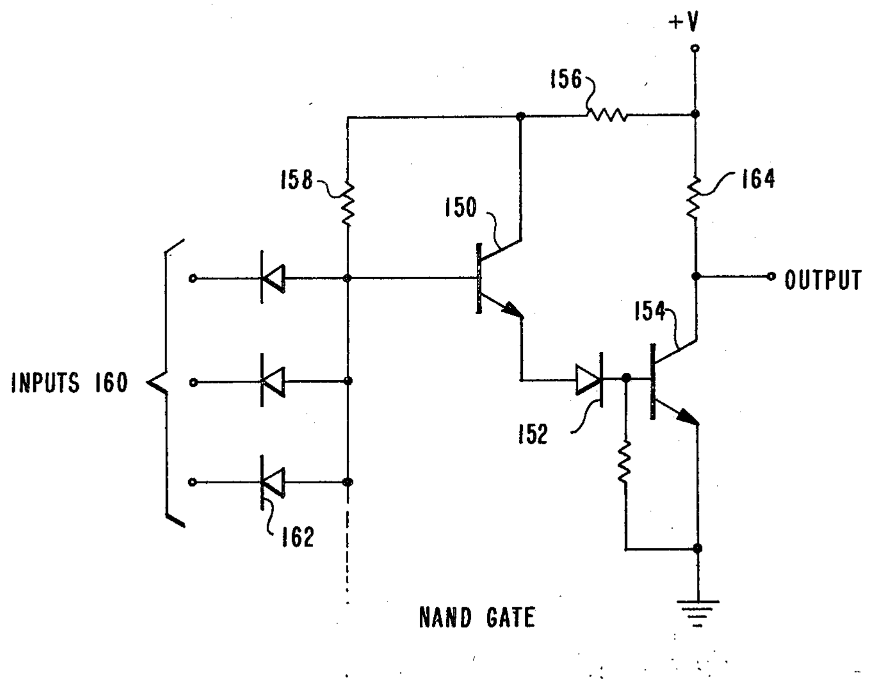
FIG. 3 is a schematic diagram of a conventional logic circuit which can be used in the arrangements of FIGS. 1A and 2.

Any conventional circuitry which provides the necessary high and low level signal outputs may be used for the various circuit components in the arrangements of FIGS. 1A and 2. One logic circuit which may be used with appropriate modification where necessary and which is illustrated schematically in FIG. 3, includes a first npn transistor 150, the emitter of which is coupled through a blocking diode 152 to the base of a second npn transistor 154. A source of positive potential is coupled through a resistor 156 to the collector of the transistor 150, and through a resistor 158 to the base to the transistor 150. A plurality of input terminals 160 are coupled through diodes 162 to the base of the transistor 150. The circuit components are appropriately valued so that the presence of signal at all of the inputs causes conduction of the transistor 150 and the associated transistor 154 providing a zero or substantially zero signal level output condition at the collector of the transistor 154. The circuit arrangement illustrated in FIG. 3 operates as a NAND gate, but may be used as other types of logic circuits by appropriate modification. For example, by eliminating all of the input terminals 160 except one, the circuit operates as an inverter.

What is claimed is:

1. A decoding system for providing an output indication when a pulse coded input signal satisfies a predetermined code sequence comprising:
- signal conductor means for receiving and propagating the input signal along the length thereof at a predetermined speed;
- gating means associated with the signal conductor means for providing a given signal condition so long as predetermined signal conditions simultaneously exist at each of a plurality of fixed points along the length of the signal conductor means; and
- output means responsive to the signal condition of the gating means for providing the output indication if the given signal condition exists for a predetermined period of time corresponding to the shortest pulse interval in said predetermined code.

2. A decoding system in accordance with claim 1 wherein:
- the input signal comprises a succession of pulse and no-pulse intervals; and
- the predetermined period of time is equal to the time required for the shortest pulse interval of an input signal satisfying the code to pass a given point on the signal conductor means.

3. A decoding system in accordance with claim 1 wherein the output means includes:
- means responsive to the given signal condition from the gating means for generating a continuous signal so long as the given signal condition exists;
- second gating means for providing the output indication upon receipt of the continuous signal unless inhibited;
- means responsive to the initiation of the continuous signal for applying a gating signal to the second gating means after the continuous signal has persisted for the predetermined period of time, said second gating means being inhibited except when the gating signal is applied.

4. A decoding system in accordance with claim 1 wherein the output means includes:
- means responsive to the signal condition of the gating means for continuously generating a signal so long as the gating means provides the given signal condition;
- second signal conductor means for receiving and propagating the generated signal along the length thereof between input and output points at a predetermined speed, the time of travel of the generated signal along the length between input and output being substantially equal to the predetermined period of time; and
- means for providing the output indication if the generated signal is simultaneously present at each of a plurality of fixed points spaced along the length of the second signal conductor means.

5. A decoding system in accordance with claim 1 wherein:
- the signal conductor means comprises a delay line;
- an input signal arranged to satisfy the code comprises a succession of pulse and no-pulse intervals each having a selected time duration corresponding to a selected length along the delay line;
- the predetermined period of time is equal to the length of the delay line corresponding to the smallest pulse or no-pulse interval in the input signal; and
- the gating means includes a plurality of taps located at the fixed points along the delay line corresponding to the pulse and no-pulse intervals in the predetermined code sequence.

6. A decoding system in accordance with claim 5 wherein:
- the duration of the pulse and no-pulse intervals of the input signal arranged to satisfy the code is fixed; and
- maximum distance between any two adjacent taps within that portion of the delay line corresponding to each pulse and no-pulse interval corresponds to the duration of the smallest interval.

7. A decoding system in accordance with claim 6 wherein:
- the location of the taps is determined in accordance with the location of the leading and trailing edges of the pulse and no-pulse intervals along the length of the delay line at a given instant in time when decoding is to begin with a first plurality of taps each being located on the delay line at a point corresponding to the leading edge of each respective pulse and no-pulse interval and a second plurality of taps being spaced along the delay line from the leading edge tap for each pulse and no-pulse interval in the direction opposite that of propagation at a maximum distance corresponding to the duration of the smallest interval, and with the spacing between the leading edge tap for each interval and the adjacent one of said second plurality for the preceding intervals not being less than said maximum distance.

8. A decoding system in accordance with claim 5 wherein:
- the duration of the pulse and no-pulse intervals in the input signal satisfying said predetermined code are variable within defined limits; and
- the maximum distance between any two adjacent taps within a length corresponding to each pulse or no-pulse interval corresponds to the minimum duration of the smallest interval.

9. A decoding system in accordance with claim 8 wherein:
- the location of the taps is determined in accordance with the location of the leading and trailing edges of the pulse and no-pulse intervals along the length of the delay line at a given instant in time when decoding is to begin with each of a plurality of taps being located at a point corresponding to the position of the leading edge of each pulse and no-pulse interval when the interval duration is at its minimum defined limit and with each of a second plurality of taps being spaced in the direction of propagation from each of a respective one of said first plurality by a distance at least equal to a length corresponding to the minimum duration plus the defined limit of variation for the respective pulse and no-pulse interval and additional taps being located between the taps of said first and second plurality within each pulse and no-pulse interval so that the distance between adjacent taps corresponds to an interval no greater than the smallest interval.

10. A decoding system in accordance with claim 9 wherein the gating means further includes:
- at least one gate circuit having a plurality of input terminals and an output terminal which provides said given signal condition when signals are simultaneously present at all input terminals with each of those taps located along the lengths corresponding to the pulse intervals being coupled to a separate one of the input terminals of the gate circuit; and a separate inverter circuit coupled between each of those taps located along the lengths corresponding to the no-pulse intervals and a separate one of the input terminals of the gate circuit.

11. A decoding system in accordance with claim 10 wherein the output means includes:

a flip-flop circuit coupled to generate a signal at its output when the given signal condition exists at the output terminal of the gate circuit;

means for generating a signal of predetermined duration when initiated;

a second gate circuit coupled to the output terminal of the gate circuit ant operative to initiate the signal generating means if the signal condition changes from the given condition;

a third gate circuit coupled to be inhibited by the signal from the signal generating means; and a second delay line coupled between the third gate circuit and the output of the flip-flop circuit and operative to apply the signal generated by the flip-flop circuit to the third gate circuit after the predetermined period of time to provide the output indication if the third gate circuit is not inhibited.

12. A decoding system in accordance with claim 10 wherein the output means includes:

means coupled to the output terminal of the gate circuit for continuously generating a signal so long as the given signal condition remains at the output terminal;

a second delay line coupled to receive the signal from the means for continuously generating and operating to propagate the signal along the entire length thereof during a period of time substantially equal to the predetermined period of time;

a plurality of taps spaced along the length of the second delay line; and a second gate circuit having a plurality of input terminals individually coupled to the taps and operative to provide the output indication if the signal from the means for continuously generating is simultaneously present at all of the taps.

References Cited

UNITED STATES PATENTS 3,004,241 10/1961 Konig.

HAROLD I. PITTS, Primary Examiner

U.S. Cl. X.R.

340—147, 149, 164, 171